Patented Nov. 2, 1926.

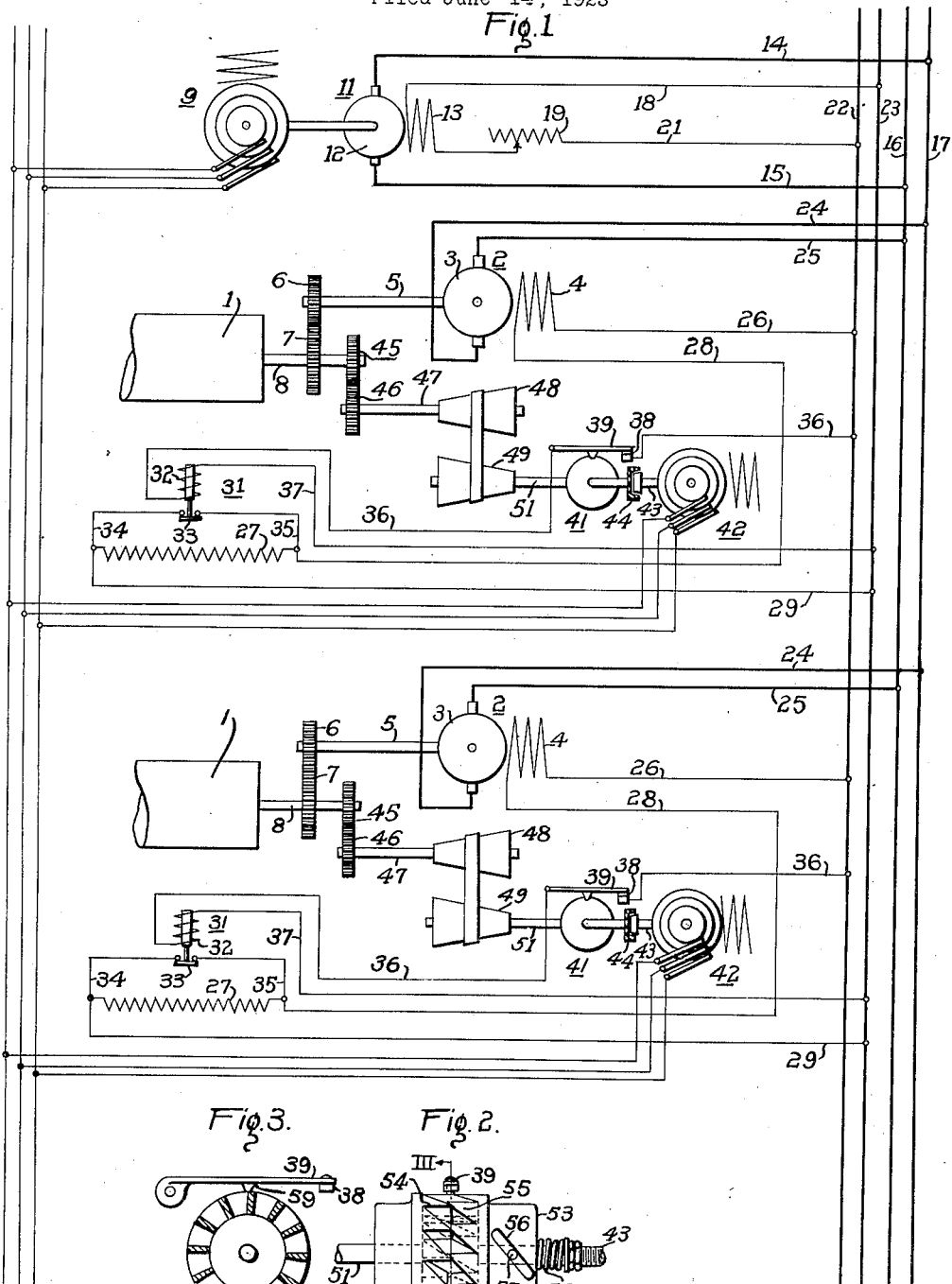

1,605,051

UNITED STATES PATENT OFFICE.

WILLIAM E. MENZIES, OF IRWIN, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 14, 1923. Serial No. 645,275.

My invention relates to regulator systems and more particularly to regulator systems for maintaining a number of machines at definite relative speeds that are variable at will.

One object of my invention is to provide a regulator system that shall govern the speeds of a number of motors and that shall maintain a substantially constant speed ratio between them.

Another object of my invention is to provide a regulator system of the above-indicated character in which the amount of correction upon each motor is directly proportional to the angular displacement from normal with respect to a master speed-reference means.

In a regulator system constructed in accordance with my invention as applied to a paper making machine, each set of paper rolls is individually motor driven and the various motors are so controlled as to maintain a constant speed ratio between them. Means are provided whereby the speed ratios between the various rolls may be varied.

In the accompanying drawing,

Fig. 1 is a schematic diagram of a system of control organized in accordance with my invention for maintaining a plurality of machines at definite relative speeds.

Fig. 2 is a perspective view of a variable interrupter used in control circuit.

Fig. 3 is a view in section through the interrupter taken on line III—III of Fig. 2 and also showing the contact arm 39.

Referring to the accompanying drawing, a number of paper rolls 1, of which only two are illustrated for the sake of convenience, are individually motor driven by means of a main motor or section motor 2. The motor 2 is provided with an armature winding 3 and a field winding 4 and is connected to drive the paper roll by means of a shaft 5, gear wheels 6 and 7 and a shaft 8. A master alternator 9 is provided as a master speed-reference means for governing the speed of the several section motors. The alternator 9 is driven by a direct current motor 11 provided with an armature winding 12 and a field winding 13.

The armature of motor 11 is connected by means of conductors 14 and 15 to variable voltage, direct current supply conductors or bus bars 16 and 17. The field winding 13 is connected by means of conductors 18 and 21 through a manually operated field resistor 19 to constant-potential, direct-current supply conductors or bus bars 22 and 23.

The armature of motor 2 is connected by means of conductors 24 and 25 to the variable voltage supply conductors 16 and 17. One terminal of the field winding 4 is connected by means of conductor 26 to one of the constant-potential direct-current supply conductors 22. The other terminal of the field winding 4 is connected by means of conductor 28 through field resistor 27 and conductor 29 to the other constant-potential direct-current supply conductor 23.

A relay 31 comprises a coil 32 which actuates contact element 33 to short circuit the field resistor 27 through conductors 34 and 35. The relay 31 is energized from the constant potential, direct-current supply conductors 22 and 23 through contact members 38. The contact members 38 are intermittently brought together and separated by the action of a contact arm 39 which is actuated by means of a variable interrupter 41.

It is apparent that contact members 38 might control the field current shunted around the resistor 27 without the use of a relay, or that a number of contact members might be directly operated by arm 39 to cut out sections of the resistor 27, thus reducing the amount of sparking which would occur with a single set of contacts.

The variable interrupter 41 is composed of two elements, one of which is actuated by a synchronous motor 42 operating through shaft 43 and a clutch member 44. The other side of the variable interrupter is actuated in accordance with the speed of the section motor to be regulated by means of gear wheels 45 and 46, shaft 47, cone pulleys 48 and 49 and shaft 51.

The structure of the variable interrupter is best shown by Figs. 2 and 3 and comprises two interlocking elements 52 and 53. The element 52 is fixed on the shaft 51 and is provided with gear teeth 54 having sloping or saw tooth shaped projections. The element 53 is movably mounted on the shaft 43 and is provided with the similarly shaped engaged teeth 55. The element 53 is provided with an angularly positioned slot 56 in which a pin 57 mounted on the shaft 43 is adapted to project. A resilient member comprising a coil spring 58 or other means is provided to urge the element 53 toward the element 52 thereby securing engagement between the teeth or projections 54 and 55.

The contact arm 39 is mounted adjacent to the variable interrupter and is provided with a projection 59 which engages the teeth 54 and 55 of the interrupter device. The contact lever 39 is normally urged toward the interrupter device thus maintaining the contacts 38 in a closed position.

It will be seen by a study of the scheme and of the structure of the interrupter device that as the elements 52 and 53 rotate, the contact arm 39 is intermittently forced upwardly or in a direction to separate the contact elements 38 thus intermittently opening the circuit controlling the relay 31. It will be further observed that the positions of the elements 52 and 53 with respect to each other determines the duration of time during which the contact arm 39 is held upwardly and this in turn determines the time of maintaining the relay 31 in an open position, thus determining the effective value of the resistor 27.

As explained above, the resilient member 58 urges the element 53 toward the element 52 until the sloping edges of the tooth shaped projections 55 abut against the sloping edges of the projections 54. It will be apparent, therefore, that the degree of interlinkage between the projections 55 and 54 depends upon the phase relation of the elements 52 and 53, and, that, as the interlinkage of the projections 55 and 54 varies, the width of that portion of the projections 55 that is projected beneath the projection 59 of the arm 39 varies, thereby varying the proportion of time that the contact members 38 are separated.

Since one side of the variable interrupter is driven in accordance with the speed of the section motor 2 and the other side of the interrupter is driven in accordance with the speed of the synchronous motor 42 which is driven from the master alternator 9, the two sides of the interrupter device are maintained at a constant relation to each other when the speed of the section motor 2 corresponds with that of the master speed-reference means or alternator 9. Should the speed of the section motor 2 vary with respect to the master alternator, the relative positions of the elements 52 and 53 of the variable interrupter change and consequently the duration of the short-circuits around the resistor 27 are correspondingly changed, thus varying the effective value of the field resistance of the motor 2. In this way, should the motor 2 fall behind the speed of the master alternator 9, the effective value of the resistor 27 would be so modified as to cause an increase in speed of motor 2, and similarly should the motor 2 increase its speed with reference to the alternator 9, the effective value of the resistor 27 would become modified in such manner as to cause a decrease in the speed of the motor 2.

Cone pulleys 48 and 49 permit of an adjustment of the speed of motor 2 with respect to the master alternator 9 such as to control the speeds of several paper rolls 1 at slightly different relative speeds. This is desirable in paper making machines in order to take into account the thinning of the stock as it passes through succesive section rolls and becomes elongated due to the rolling or pressing process.

Only two sets of rolls 1 with the corresponding control apparatus is illustrated in the drawing. It is obvious that any number of section rolls may be controlled from a single master alternator 9 in the same way as has been described above. A clutch element 44 is provided in order that the machine may operate independently of the master speed-reference means should this become desirable, as for example, when starting up the machine.

Should it become desirable to change the speed of the entire machine, that is, of all the section motors while maintaining the same relative speeds between the several sections, this may be done by varying the voltage of the supply conductors 16 and 17 in any convenient way, such as by means of the well known Ward Leonard system. In this manner, the speeds of the several section motors 2, and also the speed of the motor 11 driving the master alternator, may be varied together independently of a change in the values of the field current through the section motors 2.

The disclosure of my invention is illustrative only and many changes may be made in the arrangement of parts. I do not wish to be limited other than may be necessary by the scope of the following claims.

I claim as my invention:

1. In a regulator system, a master speed-reference means and a motor to be regulated, said motor having a field winding and a resistor in series therewith, electro-responsive means for short circuiting said resistor, a pair of contact members connected to said electro-responsive means, and variable interrupter means comprising two elements cooperatively actuating one of said contact members, one of said elements being actuated in accordance with the speed of said motor, the other of said elements being actuated in accordance with the speed of said master speed-reference means, said elements being provided with interlinking tooth shaped projections for varying the actuation of said contact member.

2. In a regulator system, the combination with a master speed-reference means and a motor, said motor having a field winding and a resistor in circuit therewith, a means for controlling the effective value of said resistor comprising a pair of contact members, a variable interrupter comprising two elements adapted to cooperatively actuate one of said contact members, said elements being provided with interlinking tooth shaped projections for varying the actuation of said contact member, and means for varying the phase relation between said elements in accordance with variations in phase relation between said motor and said master speed-reference means.

3. In a regulator system, a master speed-reference means and a motor, a resistor in circuit with said motor, a control circuit, a plurality of contact members in said control circuit and a variable interrupter for actuating one of said contact members, said variable interrupter comprising two elements, said elements being provided with interlinking tooth shaped projections for varying the actuation of said contact member, and means for varying the degree of interlinking of said projections in accordance with variations in the phase relation between said motor and said master speed-reference means.

4. In a regulator system, a motor to be regulated, said motor having a field winding, a resistor connected in circuit with said field winding, a control circuit comprising a pair of contact members for controlling the effective value of said resistor, a variable interrupter for separating said contact members comprising interlinking projections, the degree of interlinking of said projections determining the proportion of time that said contacts are separated.

5. In a regulator system, a motor having a field winding, a resistor in circuit with said field winding, a control circuit therefor comprising a pair of contact members, one of said contact members being carried by an arm having a projection, a variable interrupter for separating said contact members and comprising two elements cooperatively adapted to intermittently engage said projection.

6. In a regulator system, a master speed-reference means and a motor to be controlled, a motor-control circuit, a pair of contact members in said circuit, interrupter means for separating said contacts, said interrupter means comprising two cooperating elements, said elements being provided with interlinking projections, and means for varying the degree of interlinking by varying the phase relation between said elements.

7. In a regulator system, a master speed-reference means and a motor to be regulated, a control circuit having a pair of contact members, variable interrupter means for separating said contact members for varying durations of time, said interrupter means comprising a pair of cooperating elements, said elements being provided with interlinking projections, and means for varying the degree of interlinking in accordance with the phase relation between said motor and said master speed-reference means.

8. In a regulator system, a control circuit including a pair of contact members, one of said contact members being carried by an arm having a projection, variable interrupter means for intermittently actuating said arm comprising a pair of mechanically cooperating elements provided with interlinking projections, and means for varying the degree of interlinking of said projections, in accordance with the phase relation between said elements.

9. In a regulator system, a master speed-reference means and a motor to be controlled, a variable interrupter comprising two interlinking elements adapted to cooperatively control the speed of said motor in accordance with the degree of interlinking of said elements, means for actuating one of said elements in accordance with said master speed reference means and means for actuating the other of said elements in accordance with the speed of said motor.

10. In a regulator system, a pair of contact members, variable interrupter means for intermittently actuating one of said contact members for varying durations of time, said interrupter means comprising a pair of mechanically cooperating elements provided with interlinking projections, and means for varying the degree of interlinking by varying the phase relation between said elements.

In testimony whereof, I have hereunto subscribed my name this 6th day of June, 1923.

WILLIAM E. MENZIES.